(12) United States Patent
Schmidt et al.

(10) Patent No.: US 7,107,498 B1
(45) Date of Patent: Sep. 12, 2006

(54) SYSTEM AND METHOD FOR IDENTIFYING AND MAINTAINING RELIABLE INFRASTRUCTURE LINKS USING BIT ERROR RATE DATA IN AN AD-HOC COMMUNICATION NETWORK

(75) Inventors: Jeffrey C. Schmidt, Orlando, FL (US); Eric D. White, Cedarburg, WI (US)

(73) Assignee: MethNetworks, Inc., Maitland, FL (US)

(*) Notice: Subject to any disclaimer, the term of this patent is extended or adjusted under 35 U.S.C. 154(b) by 453 days.

(21) Appl. No.: 10/122,376

(22) Filed: Apr. 16, 2002

(51) Int. Cl.
*G06F 11/00* (2006.01)

(52) U.S. Cl. ............................. 714/704; 714/712
(58) Field of Classification Search ............... 714/704, 714/712; 455/524, 557; 358/442; 379/100.17; 370/241, 242, 254, 330, 351, 436, 448, 462, 370/465
See application file for complete search history.

(56) References Cited

U.S. PATENT DOCUMENTS

| | | | |
|---|---|---|---|
| 4,494,192 A | 1/1985 | Lew et al. .................. 364/200 |
| 4,617,656 A | 10/1986 | Kobayashi et al. ........... 370/74 |
| 4,736,371 A | 4/1988 | Tejima et al. ................. 370/95 |
| 4,742,357 A | 5/1988 | Rackley ....................... 342/457 |
| 4,747,130 A | 5/1988 | Ho ............................. 379/269 |
| 4,910,521 A | 3/1990 | Mellon ......................... 342/45 |
| 5,034,961 A | 7/1991 | Adams ......................... 375/130 |
| 5,068,916 A | 11/1991 | Harrison et al. .............. 455/39 |
| 5,231,634 A | 7/1993 | Giles et al. ................. 370/95.1 |
| 5,233,604 A | 8/1993 | Ahmadi et al. ............... 370/60 |
| 5,241,542 A | 8/1993 | Natarajan et al. .......... 370/95.3 |
| 5,317,566 A | 5/1994 | Joshi .......................... 370/60 |
| 5,392,450 A | 2/1995 | Nossen ....................... 455/12.1 |
| 5,412,654 A | 5/1995 | Perkins ...................... 370/94.1 |
| 5,424,747 A | 6/1995 | Chazelas .................... 342/70 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Guy J. Lamarre
*Assistant Examiner*—Emmanuel L. Moise
(74) *Attorney, Agent, or Firm*—Randi L. Karpinia; Joseph J. Buczynski

(57) ABSTRACT

A system and method for determining the reliability of at least one communication link between nodes in an ad-hoc communication network. The system and method perform the operations of receiving at a first node data sent by a second node over a link from the second node to the first node, determining a bit error rate (BER) at which the first node received the data, and identifying the link from the second node to the first node as being reliable when a value determined based on at least the BER and, more specifically, an aggregate of the BER and BERs of data received by the first node from the second node over a period of time, meets a desired condition. The data sent by the second node can include routing advertisement data indicating at least one node which is a neighboring node of the second node, or can be any suitable regularly expected message. The data also includes an indication as to the reliability of the link from the first node to the second node based on a measure of at least one previous message, for example, the BER or aggregate BER of at least one routing advertisement, that the second node received from the first node.

21 Claims, 3 Drawing Sheets

U.S. PATENT DOCUMENTS

| | | | |
|---|---|---|---|
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,771,467 A | 6/1998 | Sato | 455/557 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A * | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,246 A | 3/1999 | Crawley et al. | 395/200 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,949,760 A * | 9/1999 | Stevens et al. | 370/254 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/264 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | van Bokhorst et al. | 455/343 |
| 6,208,870 B1 | 3/2001 | Lorello et al. | 455/466 |
| 6,222,854 B1 * | 4/2001 | Dove | 370/456 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,735,448 B1 * | 5/2004 | Krishnamurthy et al. | 455/522 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Helie, "S If-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Slected Areas in Communications, vol. 17, No. 8.

Ad Kamerman and Guido Aben, "Net Throuput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networking using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR IDENTIFYING AND MAINTAINING RELIABLE INFRASTRUCTURE LINKS USING BIT ERROR RATE DATA IN AN AD-HOC COMMUNICATION NETWORK

BACKGROUND OF THE INVENTION

1. Field of the Invention

The present invention relates to a system and method for selecting reliable communication links between nodes in a wireless ad-hoc communication network. More particularly, the present invention relates to a system and method for using bit error rates of transmissions between a mobile or stationary node and its neighboring mobile and stationary nodes in a wireless ad-hoc communication network, to determine with which of those neighboring nodes reliable uni-directional or bi-directional communication links exist.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

In such ad-hoc networks, data flow is from node to node, and relies heavily on optimum route selection. Factors such as transmission power consumption and pipeline delays play a critical role in selecting transmission routes through the network which satisfy minimum requirements. For example, certain service classes such as the transmission of voice data, requires a minimal pipeline delay. However, minimizing pipeline delays often increase transmission power levels, which may overly burden the limited power supply of mobile nodes. Furthermore, the transmission itself requires the establishment and use of reliable communication links between nodes.

The challenge in identifying reliable links in an ad-hoc network lies in the fact that many communication links may be intermittent, unidirectional, or constantly varying in an environment where communication between nodes is sometimes difficult, even during normal operation. One indication of poor communication links between nodes is the detection of a bit error rate (BER) which exceeds allowable limits. The detection and use of bit error rates in wireless communication is discussed in U.S. Pat. No. 5,771,467 to Yukio Sato, which is incorporated herein by reference. As described in the Sato patent, the BER is constantly monitored and compared to a threshold value. The detection of a BER exceeding the threshold value halts communications between devices until the BER falls below the threshold. The Sato patent discloses a mobile station which prevents data communications when circuit quality has degraded below a threshold value, as indicated by a large BER. However, Sato does not address the location of nodes with which communication exceeds minimum BER levels, such nodes being critical to establishing a set of reliable communication links. Accordingly, a need exists for a system and method to determine bit error rates present during communication with area nodes, and creating a list of nodes having reliable links based upon the BER.

SUMMARY OF THE INVENTION

An object of the present invention is to provide a system and method for calculating bit error rates between nodes in an ad-hoc communication network to identify reliable links between the nodes.

Another object of the present invention is to provide a system and method for identifying a reliable bi-directional link between two nodes in a wireless ad-hoc communication network based on bit error rates at which routing advertisements exchanged by the nodes are received.

These and other objects are substantially achieved by providing a system and method for determining the reliability of at least one communication link between nodes in an ad-hoc communication network. The system and method perform the operations of receiving at a first node data sent by a second node over a link from the second node to the first node, determining a bit error rate (BER) at which the first node received the data, and identifying the link from the second node to the first node as being reliable when a value determined based on the BER meets a desired condition. The value can be, for example, an aggregate of BERs of data received by the first node from the second node over a period of time. The data sent by the second node can include routing advertisement data indicating at least one node which is a neighboring node of the second node, or can be any suitable regularly expected message. The data also includes information that provides an indication as to the reliability of the link from the first node to the second node. This information could be determined based on an aggregate of measurements of conditions of previous messages that the second node received from the first node over a period of time. For example, the information could be based on the aggregate of the BERs of routing advertisements that the second node received from the first node over a period of time.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
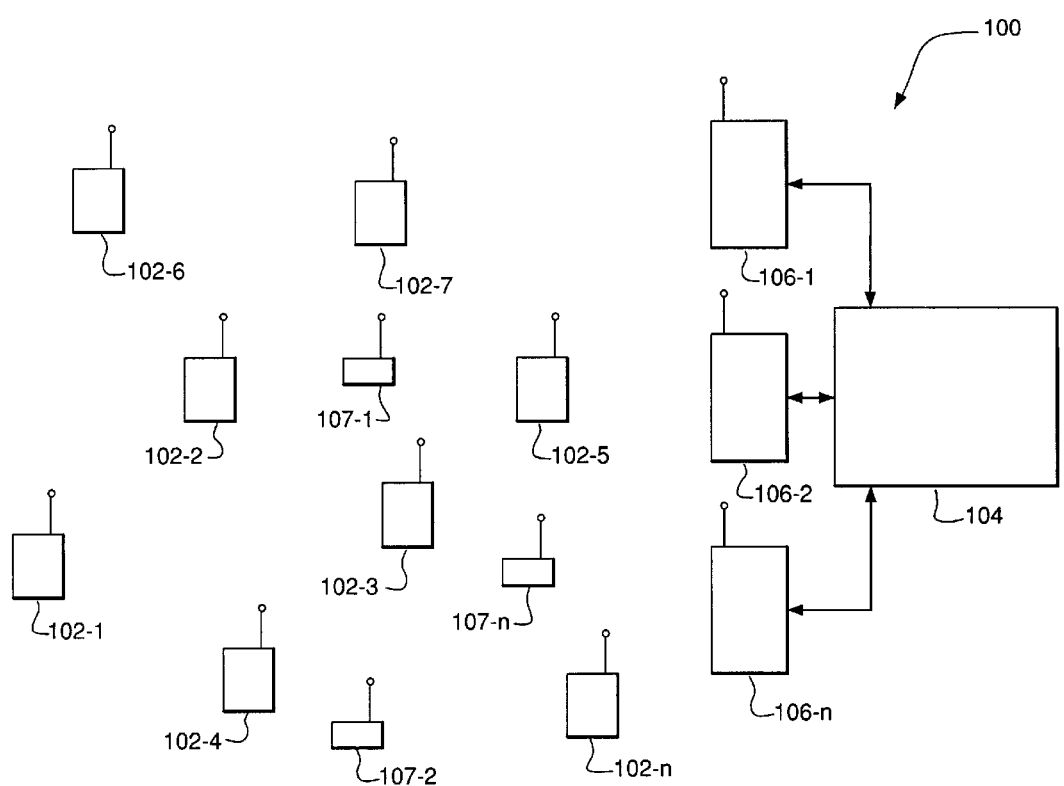
FIG. 1 is a block diagram of an example of an ad-hoc wireless communications network including a plurality of nodes and employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-*n* (referred to generally as nodes or mobile nodes 102), and a fixed network 104 having a plurality of access points 106-1, 106-2, . . . 106-*n* (referred to generally as nodes or access points 106), for providing the nodes 102 with access to the fixed network 104. The fixed network 104 includes, for example, a core local access network (LAN), and a plurality of servers and gateway routers, to thus provide the nodes 102 with access to other networks, such as other ad-hoc networks, the public switched telephone network (PSTN) and the Internet. The network 100 further includes a plurality of fixed routers 107-1 through 107-*n* (referred to generally as nodes or fixed routers 107) for routing data packets between other nodes 102, 106 or 107.

Figure 2:
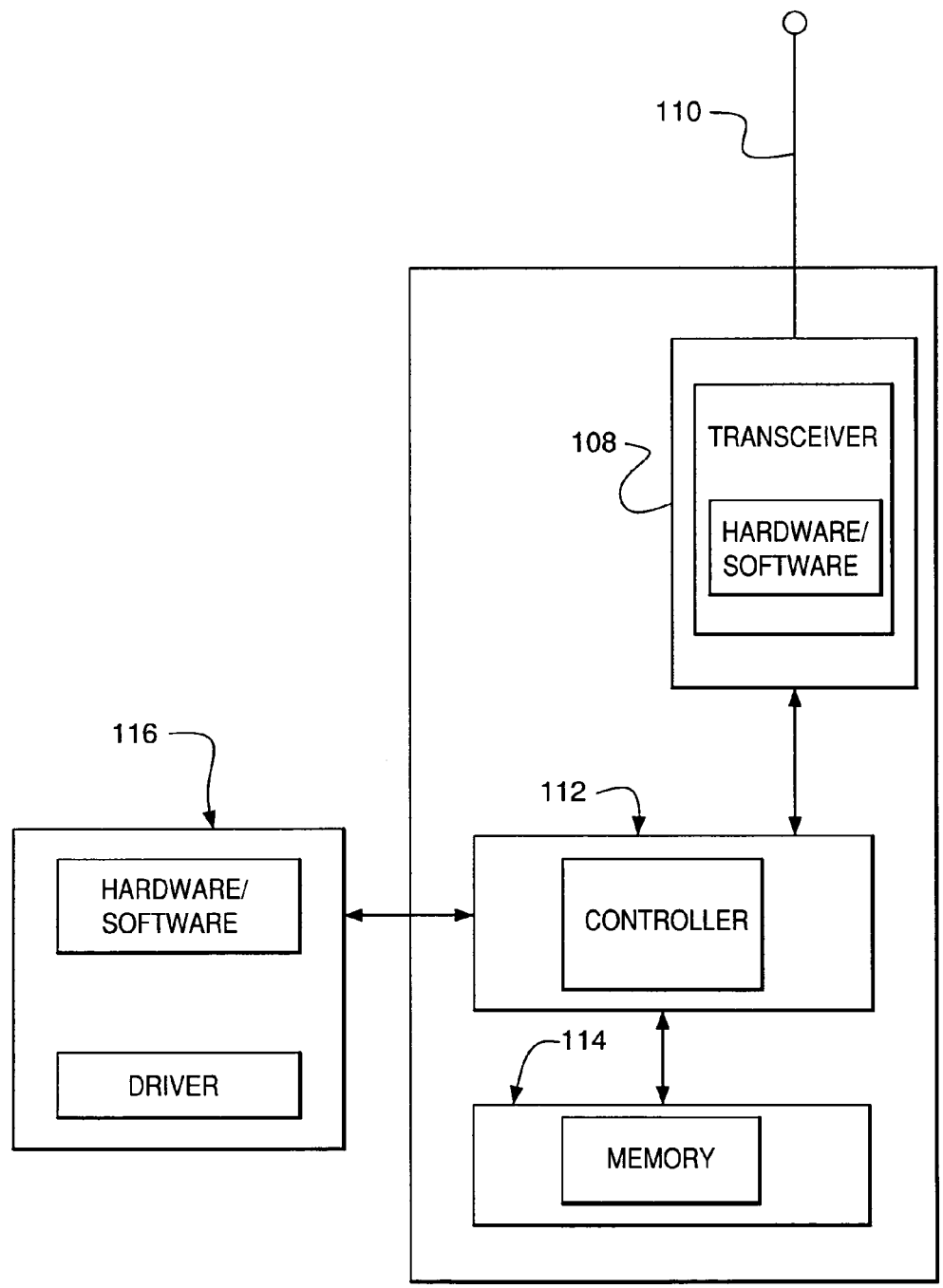
FIG. 2 is a block diagram of an example of a wireless node as shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes 102, as described in U.S. Pat. No. 5,943,322 to Mayor, which is incorporated herein by reference, and in U.S. patent application Ser. Nos. 09/897,790, 09/815,157 and 09/815,164, referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 or 107 in the network 100. The nodes 102, 106 and 107 exchange their respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast its routing table updates, and nearby nodes 102, 106 or 107 will only receive the broadcast routing table updates if within broadcast range (e.g., radio frequency (RF) range) of the broadcasting node 102, 106 or 107. For example, assuming that nodes 102-1, 102-2 and 102-7 are within the RF broadcast range of node 102-6, when node 102-6 broadcasts its routing table information, that information is received by nodes 102-1, 102-2 and 102-7. However, if nodes 102-3, 102-4 and 102-5 through 102-*n* are out of the broadcast range, none of those nodes will receive the broadcast routing table information from node 102-6.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

In an ad-hoc network 100 with the infrastructure described above, a certain number of reliable links must exist within the network infrastructure. A reliable link is defined as a connection between two nodes 102, 106 or 107 within the network 100 that provides bi-directional data exchange capability that does not exceed a specified bit error rate (BER) threshold. Specifically, a minimum number of reliable links must exist within the network 100 in order to seed the network 100 with the multiple paths allowing a communication to reach a destination node 102, 106 or 107 from any originating 102, 106 or 107 within the network 100. Additionally, a number of reliable links are required to provide service in the absence of subscriber routing resources, which would typically act as routers to a destination. Furthermore, a number of reliable links allows the capability to provide a specified quality of service required by the subscriber to deliver data, voice, or video.

However, as can be appreciated by one skilled in the art, links within the network 100 may be intermittent, unidirectional or constantly varying. That is, as discussed above, the infrastructure of the network 100 includes significant routing resources, namely, nodes 102, 106 and 107, which are either permanently mounted or slowly moving. For example, LAPs or fixed routers 107 are generally mounted in stationary positions, such as on buildings, towers, billboards, and so on, while certain mobile nodes 102 may be mounted on slow moving objects, such as cruise ships and so on.

Figure 3:
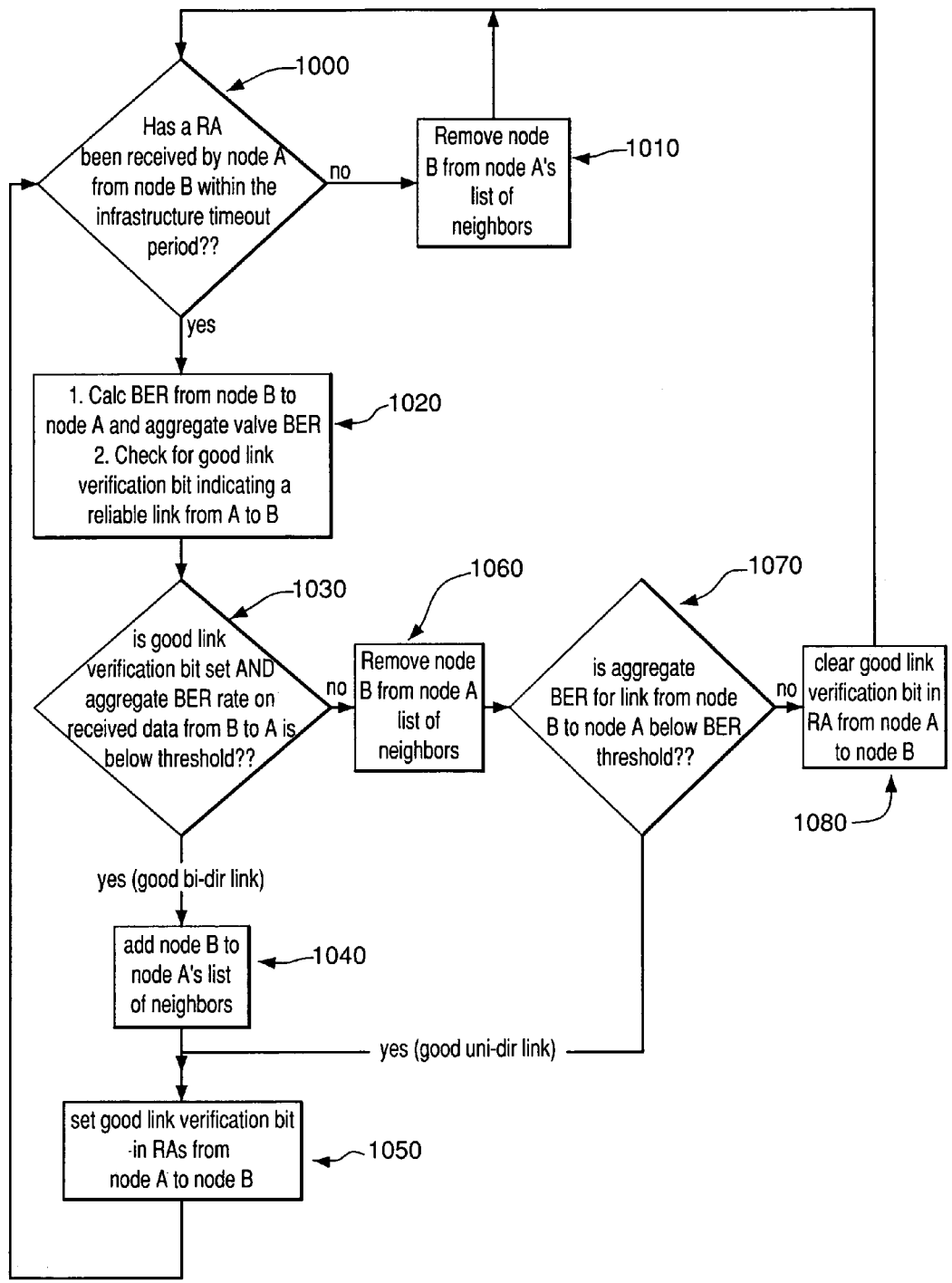
FIG. 3 is a conceptual flow diagram of an example of operations performed by nodes in the network shown in FIG. 1 to select reliable communication links in accordance with an embodiment of the present invention.

FIG. 3 is a flowchart illustrating an example of operations performed by an embodiment of the present invention to identify reliable infrastructure links using bit error rate (BER) measurements and thereafter, to maintain the status of each selected link between nodes, namely, nodes A and B, which can be any of the type of nodes 102, 106 and 107 discussed above. The selection criteria are based upon bit error rates determined from periodic routing advertisements sent from one node to another. As can be appreciated by one skilled in the art, the bit error rate in a digital transmission is defined as the percentage of bits with errors divided by total bits transmitted, received or processed over a given time.

For purposes of this discussion, the flowchart shown in FIG. 3 will be described with regard to one link between nodes A and B. However, this process can be performed for all links between node A and other nodes within the broadcast range of node A, as communication of routing advertisements occur between node A and those nodes. This process is also performed by each of the nodes in the network 100 in relation to their respective neighboring nodes. It should be also noted that although for exemplary purposes these operations are described as being performed by the controllers 112 of the nodes involved, the operations can be performed by any suitable components of the nodes, or remotely from the nodes by any other suitable components in the network 100.

In step 1000, the controller 112 of node A detects whether a routing advertisement (RA) has been received from node B. It should also be noted that instead of an actual RA, the controller 112 of node A can detect for receipt of any regularly expected transmission from node B, which is not necessarily a routing advertisement. As can be appreciated by one skilled in the art and as discussed above, node B's routing advertisements can include information regarding the node's neighbors (in this example, node B's neighbors), as well as node B's location and the best routes for reaching node B. As node B moves, node B broadcasts routing advertisements to nodes within its broadcast range to update the routing tables of those nodes with this information. Also, as discussed in more detail below, the routing advertisement from node B includes a "good link verification bit" which is either set (e.g., "1") or unset (e.g., "0") and indicates whether the link from node A to node B is a reliable link.

If a routing advertisement (or other regularly expected transmission from node B) has not been received from node B within the infrastructure timeout period in step 1010, the controller 112 of node A removes node B from node A's list of neighbors in node A's memory 114 and the processing returns to step 1000. A typical timeout period would be several seconds, for example, 5–10 seconds or even several minutes, but can be any suitable length of time. The length of the timeout period generally depends on how aggressive the network 100 is about deleting nodes from the route table. This is dependant on the inter arrival rate of the routing advertisements, and ideally, node A would need to miss several RAs from node B in a row, for example, at least 5 RAs in a row, for the controller 112 of node A to consider that node B is no longer a neighbor node, due to the fact that broadcast messages in a busy CSMA/CA radio can frequently be missed due to packet collisions. The number of permitted missed RAs (or other regularly expected transmissions) will be higher if the link is not expected to ever quickly degrade due to failure, or other interference, and lower if it is expected to quickly degrade.

However, if a routing advertisement has been received from node B within the infrastructure timeout period, in step 1020, the controller 112 of node A calculates the bit error rate (BER) for the data on the link from node B to node A, and calculates an aggregate value representing an aggregate of the BERs for routing advertisements (or other regularly expected transmissions) over a period of time. The aggregate can include any suitable number of received RAs (or other messages) which is believed to provide a reasonable indication of the quality of the link, and can be set based on how aggressively that a link should be identified as reliable or unreliable. For example, the controller 112 of node A can start calculating the value representing the aggregate BER upon receiving the first message from node B, but it can take around 10 or more messages to determine a reasonable indication of the link quality. For each good message received, the controller 112 adds a fixed amount to the aggregate value, and for each bad message (too many bit errors) subtracts a fixed amount from the aggregate value. A typical suitable BER is at or about $10^{-4}$ for a wireless system capable of providing a 'high' quality of service. The amount of good and bad messages eventually balances out as an average over time, and this average indicates whether the link quality is acceptable or unacceptable. This history-based or average-based link quality, based on bit errors, can be achieved using any message received from that neighbor (node B) whether that message has been broadcast to all nodes within range of node B, or unicast specifically to node A. The reason one (or even two or three) message from node B is typically not a sufficient indicator of link quality is that bit errors can occur occasionally due to extraneous conditions such as interference, packet collisions, or other causes of errors in a transmission which are not indicative of the overall quality of the link. Nevertheless, for purposes of this embodiment of the invention, the number of received messages used to determine the aggregate value can be any suitable amount from a single message to several tens or more. It should be further noted that this determined value for the given neighbor (i.e., node B) for which the controller 112 of node A is calculating this value is based only on the messages received from that neighbor. However, this process can be simultaneously occurring for any number of neighbors of node A.

During step 1020, the controller 112 of node A also determines whether the RA (or other regularly expected transmission) received from node B includes a message, such as a set "good link verification bit", indicating that a reliable link exists for sending messages from node A to node B. That is, the bit is "set" (e.g., has a value of "1") by the controller 112 of node B when the aggregate value representing an aggregate BER of a suitable number of messages, such as RAs, previously sent from node A and received by node B over a link from node A to node B over a period of time, is below the threshold, and is unset (e.g., has a value of "0") when the aggregate BER is above the threshold. These operations performed by the controller 112 of node B for calculating the aggregate value for messages being received by node B from node A is similar to that described above, and is explained in more detail below.

The processing then proceeds to step 1030 where the controller 112 of node A determines whether the aggregate BER, as represented by the aggregate value for the data (e.g., the RA) and a desired previous amount of data (e.g., previous number of RAs) sent on the link from node B to node A, is below a desired threshold. A typical suitable BER threshold is at or about $10^{-4}$ for a wireless system capable of providing a 'high' quality of service. In this example, because the controller 112 adds to the aggregate value upon receipt of a "good" message (i.e., message received with acceptable BER) and subtracts from the aggregate value upon receipt of a bad message, the controller 112 compares the aggregate value to a predetermined value. If the aggregate value is at or above the predetermined value, this indicates that the aggregate BER is below the desired threshold BER. However, if the aggregate value is below the predetermined value, this indicates that the aggregate BER is above the desired threshold BER. Naturally, the controller 112 can be configured to use any suitable methodology to examine the BERs of the received messages and to determine whether the aggregate of those BERs meets a suitable BER level indicative of a reliable link.

Also in step 1030, the controller 112 of node A determines whether the "good link verification bit" is "set" in the RA (or other regularly expected message) received by node A from node B. Verifying that the "good link verification bit" is set indicates that as a minimum, step 1050 (discussed below) was performed by node B as discussed in more detail below. If the "good link verification bit" has been set in the received RA and the aggregate BER of the received data and the previously received data is determined to be below the threshold value in the manner described above, the processing proceeds to step 1040 where the controller 112 of node A determines that a reliable bi-directional link exists between nodes A and B. Also in step 1040, the controller 112 of node A will add node B to node A's list of neighbors stored in node A's memory 114, thus indicating that the bi-directional link between nodes A and B has been found to be a reliable infrastructure communication link, providing bi-directional data exchange capabilities that do not exceed a specified bit error rate threshold value.

The processing then proceeds to step 1050 where the controller 112 of node A sets the "good link verification bit"

in the routing advertisements sent by node A. Hence, all nodes within node A's broadcast range, including node B, which receive the routing advertisements will recognize that a reliable link exists between node B and node A. The processing then returns to step 1000.

However, if it is determined in step 1030 that either the "good link verification bit" has not been received by node B or the aggregate BER is greater than the threshold value, the processing proceeds to step 1060 where the controller 112 of node A will remove node B from node A's list of neighbor nodes. In step 1070, even though node B is removed from node A's neighbor node list in step 1060 because the "good link verification bit" provided in the RA from node B was not set (thus indication that the link from node A to node B is unacceptable), if the aggregate BER is below the threshold value, the controller 112 of node A recognizes the link from node B to node A to be a reliable unidirectional link. Accordingly, the processing proceeds to step 1050 whether the controller 112 of node A sets the "good link verification bit" in future routing advertisements sent by node A. The processing then returns to step 1000 and is repeated.

However, if it is determined in step 1070 that the aggregate BER is not below the threshold value, the controller 112 of node A does not set or clears the "good link verification bit" in step 1080, and the process returns to step 1000 and repeats.

It should be clarified that the above process is performed independently on all nodes. That is, node B performs the above process with regard to node A and node B's neighboring nodes, and so on. Accordingly, as discussed above, the controller of node B sets the "good link verification bit" in its RA message (i.e., the message received by node A as discussed above) which verifies that the link from node A to node B is a reliable link if the RA node B has previously received from node A has an aggregate BER below the desired threshold.

In other words, the "good link verification bit" is only used to signal back to a transmitting node that an RA was received by a receiving node such that the aggregate BER for that RA (or other messages) and a suitable number of previously received RAs (or those other messages) is below a certain threshold. So a typical scenario can be as follows: Node A sends an RA (or other regularly expected message) to node B, and node B performs the steps shown in FIG. 3 to measure the aggregate BER. If the aggregate BER is below a certain threshold, node B sets the "good link verification bit" in the next RA sent back to node A (and to any other nodes in its broadcast range). Node A measures the aggregate BER in the RA from node B to node A (this is where the process beginning at step 1000 discussed above is performed by node A). If the controller 112 of node A determines that the "good link verification bit" is set and the aggregate BER is below a certain threshold (see step 1030 discussed above), node A determines that a reliable bi-directional link exists between node A and node B. Node A can now set the "good link verification message" bit in messages sent to node B.

As can be appreciated from the above this entire process for verifying that a suitable bidirectional link exists between nodes A and B requires a minimum of three transmissions between nodes A and B. For example, an RA is from node A to node B, an RA is sent from node B to node A including a set "good link verification bit" indicating that a reliable unidirectional link exists from node A to node B, and another RA is sent from node A to node B indicating that a reliable bi-directional link exists between nodes A and B. However, as a practical matter the number of RAs exchanged between nodes A and B to establish suitable aggregate BERs will require the exchange of a greater amount of messages, for example, several tens of messages or possibly more.

As will be appreciated by one skilled in the art, the embodiment described above provides several advantages over conventional link quality measuring techniques. For instance, reliable links are selected using BER measurement data, which is an absolute indicator of real-time link quality. On the contrary, received signal strength measurements, which are typically used as link quality indicators, may vary significantly from unit to unit due to variations in manufacturing processes and component tolerances. Additionally, unreliable links, which may experience difficulty in exchanging link quality information, may simply be ignored.

Furthermore, since the emphasis in the embodiment shown is on selecting reliable links, link quality data can be readily exchanged between nodes, yielding fast reliable fast link selection. Finally, the acceptable link quality threshold is programmable, in that BER threshold values may be configured at levels which vary for service classes provided.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining the reliability of a bi-directional communication link between nodes in an ad-hoc communication network, comprising:

receiving at a first node data sent by a second node over a link from said second node to said first node, said data sent by said second node including an indication as to the reliability of a link from said first node to the second node based on a measure of at least one previous message that said second node received from said first node;

determining a bit error rate (BER) at which said first node received said data; and determining that a bi-directional link between said first and second nodes meets a desired criteria when a value determined based on at least said BER meets a desired condition and said indication indicates that the reliability of the link from said first node to said second node is at least at an acceptable level.

2. A method as claimed in claim 1, wherein:

said value is based on an aggregate of said BER and a plurality of BERs at which a plurality of other data are received by said first node from said second node over said link during a period of time prior to that at which said first node receives said data.

3. A method as claimed in claim 1, wherein:

said ad-hoc communication network is a multihopping wireless communication network in which said nodes communicate such that each of said nodes including said first and second nodes, is operable as a router to route packets it receives that are destined to a different one of said nodes to that different one of said nodes; and said data is a routing advertisement transmitted by second node, the routing advertisement includes routing advertisement data indicating at least one node which is a neighboring node of said second node and for which said second node is operable as a router to route packets from said at least one other node destined to another node.

4. A method as claimed in claim 1, wherein:
said value of said BER meets said desired condition when said value is below a threshold value.

5. A method as claimed in claim 1, wherein:
said indication is a good link verification bit that is at a first status when said link from said first node to the second node is at least at the acceptable level and is at a second status when said link from said first node to said second node is below the acceptable level.

6. A method as claimed in claim 1, wherein:
said measure of said previous message is a determination that a BER at which said second node received said at least one previous message meets said desired condition.

7. A method as claimed in claim 1, further comprising:
controlling said first node to transmit a message including information indicating that said bidirectional link meeting said desired criteria exists.

8. A computer-readable medium of instructions for controlling nodes in an ad-hoc communication network to determine the reliability of a bi-directional communication link between said nodes, comprising:
a first set of instructions, adapted to control a first node to receive data sent by a second node over a link from said second node to said first node, said data sent by said second node including an indication as to the reliability of a link from said first node to the second node based on a measure of at least one previous message that said second node received from said first node;
a second set of instructions, adapted to control said first node to determine a bit error rate (BER) at which said first node received said data; and
a third set of instructions, adapted to control said first node to determine that a bi-directional link between said first and second nodes meets a desired criteria when a value determined based on at least said BER meets a desired condition and said indication indicates that the reliability of the link from said first node to said second node is at least at an acceptable level.

9. A computer readable medium of instructions as claimed in claim 8, wherein:
said value is based on an aggregate of said BER and a plurality of BERs at which a plurality of other data are received by said first node from said second node over said link during a period of time prior to that at which said first node receives said data.

10. A computer-readable medium of instructions as claimed in claim 8, wherein:
said ad-hoc communication network is a multihopping wireless communication network in which said nodes communicate such that each of said nodes, including said first and second nodes, is operable as a router to route packets it receives that are destined to a different one of said nodes to that different one of said nodes; and
said data is a routing advertisement transmitted by the second node, the routine advertisement includes routing advertisement data indicating at least one node which is a neighboring node of said second node and for which said second node is operable as a router to route packets from said at least one other node destined to another node.

11. A computer-readable medium of instructions as claimed in claim 8, wherein:
said value of said BER meets said desired condition when said value is below a threshold value.

12. A computer-readable medium of instructions as claimed in claim 8, wherein:
said indication is a good link verification bit that is at a first status when said link from said first node to the second node is at least at the acceptable level and is at a second status when said link from said first node to said second node is below the acceptable level.

13. A computer-readable medium of instructions as claimed in claim 8, wherein:
said measure of said previous message is a determination that a BER at which said second node received said at least one previous message meets said desired condition.

14. A computer-readable medium of instructions as claimed in claim 8, further comprising:
a fifth set of instructions, adapted to control said first node to transmit a message including information indicating that said bi-directional link meeting said desired criteria exists.

15. A node in an ad-hoc communication network, adapted to determine the reliability of a bi-directional communication link between itself an at least one other node in the ad-hoc communication network, said node comprising:
a receiver, adapted to receive data sent by a second node over a link from said second node to said first node, said data sent by said second node including an indication as to the reliability of a link from said first node to the second node based on a measure of at least one previous message that said second node received from said first node; and
a controller, adapted to determine a bit error rate (BER) at which said first node received said data, and to determine that a bi-directional link between said first and second nodes meets a desired criteria when a value determined based on at least said BER meets a desired condition and said indication indicates that the reliability of the link from said first node to said second node is at least at an acceptable level.

16. A node as claimed in claim 15, wherein:
said value is based on an aggregate of said BER and a plurality of BERs at which a plurality of other data are received by said first node from said second node over said link during a period of time prior to that at which said first node receives said data.

17. A node as claimed in claim 15, wherein:
said ad-hoc communication network is a multihopping wireless communication network in which said nodes communicate such that each of said nodes, including said first and second nodes, is operable as a router to route packets it receives that are destined to a different one of said nodes to that different one of said nodes; and
said data is a routing advertent transmitted by the second node, the routing advertisement includes routing advertisement data indicating at least one node which is a neighboring node of said second node and for which said second node is operable as a router to route packets from said at least one other node destined to another node.

18. A node as claimed in claim IS, wherein:
said value of said BER meets said desired condition when said value is below a threshold value.

19. A node as claimed in claim 15, wherein
said indication is a good link verification bit that is at a first status when said link from said first node to the second node is at least at the acceptable level and is at a second status when said link from said first node to said second node is below the acceptable level.

20. A node as claimed in claim 15, wherein:
said measure of said previous message is a determination that a BER at which said second node received said at least one previous message meets said desired condition.

21. A node as claimed in claim 15, wherein:
said controller is further adapted to control said first node to transmit a message including information indicating that said bi-directional link meeting said desired criteria exists.

* * * * *